United States Patent
Pisklak et al.

(10) Patent No.: US 10,087,359 B2
(45) Date of Patent: Oct. 2, 2018

(54) EXTENDED-LIFE CEMENT COMPOSITIONS COMPRISING RED MUD SOLIDS

(71) Applicant: Halliburton Energy Services, Inc., Houston, TX (US)

(72) Inventors: Thomas Jason Pisklak, Houston, TX (US); Kyriacos Agapiou, Houston, TX (US); Juan Humberto Martinez, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/514,385

(22) PCT Filed: Oct. 28, 2014

(86) PCT No.: PCT/US2014/062611
§ 371 (c)(1),
(2) Date: Mar. 24, 2017

(87) PCT Pub. No.: WO2016/068874
PCT Pub. Date: May 6, 2016

(65) Prior Publication Data
US 2017/0306211 A1    Oct. 26, 2017

(51) Int. Cl.
*E21B 33/13* (2006.01)
*C09K 8/467* (2006.01)
(Continued)

(52) U.S. Cl.
CPC .......... *C09K 8/467* (2013.01); *C04B 18/0409* (2013.01); *C04B 24/003* (2013.01);
(Continued)

(58) Field of Classification Search
CPC ...... E21B 33/14; E21B 37/00; E21B 47/0005; E21B 21/003; E21B 33/13; E21B 33/138; E21B 33/16
See application file for complete search history.

(56) References Cited

U.S. PATENT DOCUMENTS

| 5,472,051 A | 12/1995 | Brothers |
| 6,153,562 A | 11/2000 | Villar et al. |

(Continued)

FOREIGN PATENT DOCUMENTS

| WO | 1995019942 | 7/1995 |
| WO | 2010116143 | 10/2010 |

(Continued)

OTHER PUBLICATIONS

International Search Report and Written Opinion for PCT/US14/62611 dated Jul. 22, 2015.
(Continued)

*Primary Examiner* — Zakiya W Bates
(74) *Attorney, Agent, or Firm* — Craig W. Roddy; Tumey L.L.P.

(57) ABSTRACT

Extended-life cement compositions are provided and, more particularly, extended-life cement compositions are provided that comprise a cementitious component comprising red mud solids and hydraulic cement. A method of cementing may comprise providing an extended-life cement composition comprising a cementitious component, water, and a cement set retarder, wherein the cementitious component comprises red mud solids and a hydraulic cement; activating the extended-life cement composition; introducing the extended-life cement composition into a subterranean formation; and allowing the extended-life cement composition to set in the subterranean formation.

19 Claims, 2 Drawing Sheets

(51) Int. Cl.
    *C04B 28/04*     (2006.01)
    *C04B 18/04*     (2006.01)
    *C04B 24/00*     (2006.01)
    *C04B 24/26*     (2006.01)
    *E21B 33/14*     (2006.01)
    *C04B 103/22*     (2006.01)
    *C04B 103/40*     (2006.01)

(52) U.S. Cl.
    CPC .......... *C04B 24/2647* (2013.01); *C04B 28/04* (2013.01); *E21B 33/14* (2013.01); *C04B 2103/22* (2013.01); *C04B 2103/408* (2013.01)

(56) References Cited

U.S. PATENT DOCUMENTS

| 2012/0006546 | A1 | 1/2012 | Michaux et al. |
| 2012/0138300 | A1 | 6/2012 | Bray et al. |
| 2012/0279707 | A1 | 11/2012 | Funkhouser et al. |
| 2013/0233550 | A1 | 9/2013 | Brothers et al. |
| 2014/0083701 | A1 | 3/2014 | Boul et al. |
| 2014/0202698 | A1 | 7/2014 | Pisklak et al. |
| 2015/0315875 | A1* | 11/2015 | Chatterji .................. C04B 7/02 166/285 |

FOREIGN PATENT DOCUMENTS

| WO | 2016122530 | 8/2016 |
| WO | 2017007473 | 1/2017 |

OTHER PUBLICATIONS

Australian Examination Report for PCT/US14/62611 dated Sep. 1, 2017.

\* cited by examiner

EXTENDED-LIFE CEMENT COMPOSITIONS COMPRISING RED MUD SOLIDS

BACKGROUND

Extended-life cement compositions are provided and, more particularly, extended-life cement compositions are provided that comprise a cementitious component comprising red mud solids and hydraulic cement.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e. a cement sheath) that may support and position the pipe string in the wellbore and may bond the exterior surface of the pipe string to the subterranean formation. Among other things, the cement sheath surrounding the pipe string prevents the migration of fluids in the annulus and protects the pipe string from corrosion. Cement compositions may also be used in remedial cementing methods to seal cracks or holes in pipe strings or cement sheaths, to seal highly permeable formation zones or fractures, or to place a cement plug and the like.

A broad variety of cement compositions have been used in subterranean cementing operations. In some instances, extended-life cement compositions have been used. In contrast to conventional cement compositions that set and hard upon preparation, extended-life cement compositions are characterized by being capable of remaining in a pumpable fluid state for at least about one day (e.g., about 7 days, about 2 weeks, about 2 years or more) at room temperature (e.g., about 80° F.) in storage. When desired for use, the extended-life cement compositions should be capable of activation and consequently develop reasonable compressive strengths. For example, an extended-life cement composition that is activated may set into a hardened mass. Among other things, extended-life cement compositions may be suitable for use in wellbore applications such as applications where it is desirable to prepare the cement composition in advance. This may allow the cement composition to be stored prior to use. In addition, this may allow the cement composition to be prepared at a convenient location before transportation to the job site. Accordingly, capital expenditures may be reduced due to a reduction in the need for on-site bulk storage and mixing equipment. This may be particularly useful for offshore cementing operations where space onboard the vessels may be limited.

While extended-life cement compositions have been developed heretofore, challenges exist with their successful use in subterranean cementing operations. For example, some extended-life compositions may have limited use at lower temperatures as they may not develop sufficient compressive strength when used in subterranean formations having lower bottom hole static temperatures. In addition, it may be problematic to activate some extended-life cement compositions while maintaining acceptable thickening times and compressive strength development. Moreover, supply/inventor constraints may restrict the availability of certain key components of extended-life cement compositions depending on geographic availability.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Figure 1:
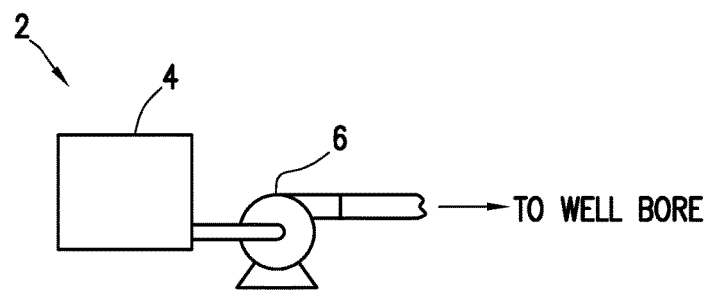
FIG. 1 illustrates a system for preparation and delivery of an extended-life cement composition to a wellbore in accordance with certain embodiments.

Extended-life cement compositions are provided and, more particularly, extended-life cement compositions are provided that comprise a mixture of red mud solids and hydraulic cement. The extended-life cement compositions may have desirable rheological properties allowing them to be stored on the surface for an extended period of time and subsequently activated prior to pumping downhole. One of the many potential advantages to these compositions is that an effective use for red mud solids may be provided thus minimizing the amount of the waste being deposited in disposal sites, such as containment reservoirs. Another potential advantage of these methods and compositions is that the cost of subterranean operations may be reduced by replacement of higher cost additives (e.g., Portland cement and other hydraulic cements) with the red mud solids. Yet another potential advantage of these compositions is that the extended-life cement compositions when activated may provide a set cement with sufficient strength for use in wellbore applications, such as primary and remedial cementing, among others. Yet another potential advantage is that red mud solids may be readily available in certain geographic locations where other the inventory/availability of other components of extended-life cement compositions may be limited.

The cementitious component included in the extended-life cement compositions may comprise red mud solids. As used herein, the term "red mud solids" refers to a solid waste/by-product produced when bauxite is refined using the Bayer process to produce alumina. The Bayer process is the most common method for extracting alumina from bauxite ore. In the Bayer process, the bauxite is processed resulting in an insoluble residue, which is the bauxite ore from which the alumina has been extracted. This insoluble residue is commonly produced in the Bayer process in a sludge or mud commonly known as "red mud." Red mud may also be known as "bauxite refinery residue." A typical alumina plant may produce one to two times as much red mud as alumina. The red mud together with the incorporated red mud solids have typically been considered an undesirable by product that can add costs to the production of alumina as well as environmental concerns associated with its disposal. Currently, the red mud is typically held in disposal sites such as landfills or retention ponds, or left exposed in piles on the surface. The term "red mud solids," as used herein, is also intended to encompass red mud solids that have been processed or stabilized in some manner, such as by drying, for example.

The red mud solids may be provided in any suitable form, including as dry solids or in red mud, which may comprise red mud solids and water. The cementitious component may comprise the red mud. The water content of the red mud may be as high as 25% by weight of the red mud or potentially even higher. If desired, the red mud comprising the red mud solids may be dried to reduce its water content prior to use. Natural or mechanical means may be used for drying the red mud. By way example, the red mud may be air dried or drum dried.

While the chemical analysis of red mud solids will typically vary from various manufacturers depending on a number of factors, including the particular solid material feed, process conditions, treatments, and the like, red mud typically may comprise a mixture of solid and metallic oxide-bearing minerals. By way of example, the red mud solids may comprise a number of different oxides (based on oxide analysis), including, without limitation, $Na_2O$, $MgO$, $Al_2O_3$, $SiO_2$, $CaO$, and/or $Fe_2O_3$. Moreover, the red mud solids generally may comprise a number of different crystal structures, including, without limitation, calcite ($CaCO_3$), quartz ($SiO_2$), hematite ($Fe_2O_3$), hauyne ($Na_3CaAl_3Si_3O_{12}$ ($SO_4)_2$), kaolinite, and/or muscovite.

The red mud solids may serve as a low cost component in extended-life cement compositions. In addition, the red mud solids may have pozzolanic activity such that the red-mud solids may react with calcium hydroxide in the presence of water. As will be appreciated, calcium hydroxide may be provided in the extended-life cement compositions from the hydration reaction of the hydraulic cement, such as Portland cement. Additional calcium hydroxide may also be separately added to the extended-life cement composition.

The red mud solids may be included in the extended-life cement compositions in a crushed, ground, powder, or other suitable particulate form. The red mud solids may have a particle size distribution for a particular application, for example, a d50 particle size distribution of from about 1 micron to about 200 microns and, alternatively, from about 10 microns to about 50 microns. By way of further example, the red mud solids may have a d50 particle size distribution ranging between any of and/or including any of about 1 micron, about 5 microns, about 10 microns, about 20 microns, about 30 microns, about 40 microns, about 50 microns, about 60 microns, about 70 microns, about 80 microns, about 90 microns, about 100 microns, about 150 microns, or about 200 microns. One of ordinary skill in the art, with the benefit of this disclosure, should be able to select an appropriate particle size for the red mud solids for a particular application.

The red mud solids may be included in the extended-life cement compositions in an amount suitable for a particular application. For example, the red mud solids may be included in the extended-life cement compositions in an amount in the range of from about 50% to about 90% by weight of the cementitious component. By way of further example, the red mud solids may be present in an amount ranging between any of and/or including any of about 50%, about 55%, about 65%, about 70%, about 75%, about 80%, about 85%, or about 90% by weight of the cementitious component. In a particular example, the red mud solids may be present in an amount of about 50% to about 80% by weight of the cementitious component. One of ordinary skill in the art, with the benefit of this disclosure, should recognize the appropriate amount of the red mud solids to include for a chosen application.

The cementitious component may further comprise hydraulic cement. Any of a variety of hydraulic cements may be suitable including those comprising calcium, aluminum, silicon, oxygen, iron, and/or sulfur, which set and harden by reaction with water. Specific examples of hydraulic cements that may be suitable include, but are not limited to, Portland cements, pozzolana cements, gypsum cements, high alumina content cements, silica cements, and any combination thereof. Examples of suitable Portland cements may include those classified as Classes A, B, C, G, or H cements according to American Petroleum Institute, *API Specification for Materials and Testing for Well Cements*, API Specification 10, Fifth Ed., Jul. 1, 1990. Additional examples of suitable Portland cements may include those classified as ASTM Type I, II, III, IV, or V.

The hydraulic cement may be included in the cementitious component in an amount suitable for a particular application. The concentration of the hydraulic cement may also be selected, for example, to provide a particular compressive strength for the extended-life cement composition after setting. Where used, the hydraulic cement may be included in an amount in a range of from about 10% to about 50% by weight of the cementitious component. By way of example, the hydraulic cement may be present in an amount ranging between any of and/or including any of about 10%, about 15%, about 20%, about 25%, about 30%, about 35%, about 40%, about 45%, or about 50% by weight of the cementitious component. In one particular example, the hydraulic cement may be present in an amount in a range of from about 20% to about 75% by weight of the cementitious component. One of ordinary skill in the art, with the benefit of this disclosure, should recognize the appropriate amount of the hydraulic cement to include for a chosen application.

The cementitious component comprising the red mud solids and hydraulic cement may be included in the extended-life cement composition in an amount sufficient for a particular application. For example, the cementitious component may be included in the extended-life cement composition in an amount in the range of from about 30% to about 60% by weight of the extended-life cement composition. By way of further example, the cementitious component may be present in an amount ranging between any of and/or including any of about 30%, about 35%, about 40%, about 45%, about 50%, about 55%, or about 60% by weight of the extended-life cement composition. The extended-life cement composition may be free of any additional cementation components in that no other cementitious component may be included in the extended-life cement composition. One of ordinary skill in the art, with the benefit of this disclosure, should recognize the appropriate amount of the cementitious component to include for a chosen application.

The extended-life cement composition may further comprise a cement set retarder. A broad variety of cement set retarders may be suitable for use. For example, the cement set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or terpolymers comprising sulfonate and carboxylic acid groups such as sulfonate-functionalized acrylamide-acrylic acid copolymers; borate compounds such as alkali borates, sodium metaborate, sodium tetraborate, potassium pentaborate; derivatives thereof, or mixtures thereof. Examples of suitable cement set retarders include, among others, phosphonic acid derivatives. One example of a suitable cement set retarder is Micro Matrix® cement retarder, available from Halliburton Energy Services, Inc., Houston, Tex. Generally, the cement set retarder may be present in the extended-life cement composition in an amount sufficient to delay the setting for a desired time. The cement set retarder may be present in the extended-life cement composition in an amount in the range of from about 0.01% to about 10% by weight of the cementitious component. More particularly, the cement set retarder may be present in an amount ranging between any of and/or including any of about 0.01%, about 0.1%, about 1%, about 2%, about 4%, about 6%, about 8%, or about 10% by weight of the cementitious component. One of ordinary skill in the art, with the benefit of this disclosure, should recognize the appropriate amount of the cement set retarder to include for a chosen application.

The extended-life cement compositions may further comprise a secondary cement set retarder in addition to the afore-mentioned set retarder. The secondary set retarder (or retarders) may be used to mitigate the effect of cementitious contaminants (e.g. residual manufacturing contaminants) on the extended-life cement compositions. Cementitious contaminants, as defined herein, refers to any material that is not an intended component of the extended-life cement composition; said material being unintentionally added, directly or indirectly, to the extended-life cement composition; wherein said material is cementitious in and of itself, becomes cementitious upon the unintended contact with the extended-life cement composition, and/or promotes or induces early setting, gelling, or any other type of cementitious reaction in the extended-life cement composition. A broad variety of secondary set retarders may be suitable for use in the extended-life cement compositions. The secondary set retarder may be chemically different from the primary set retarder; alternatively the secondary set retarder may be chemically similar to the primary set retarder. For example, the secondary set retarders may comprise phosphonic acids, such as ethylenediamine tetra(methylene phosphonic acid), diethylenetriamine penta(methylene phosphonic acid), etc.; phosphonic acid derivatives; lignosulfonates, such as sodium lignosulfonate, calcium lignosulfonate, etc.; salts such as stannous sulfate, lead acetate, monobasic calcium phosphate; organic acids such as citric acid, tartaric acid, etc.; cellulose derivatives such as hydroxyl ethyl cellulose (HEC) and carboxymethyl hydroxyethyl cellulose (CM-HEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof or mixtures thereof. One example of a suitable commercial secondary set retarder is Micro Matrix® cement retarder, available from Halliburton Energy Services, Inc., Houston, Tex. Generally, the secondary set retarder may be present in the extended-life cement compositions in an amount sufficient to delay setting for a desired time. In some embodiments, the secondary set retarder may be present in the extended-life cement compositions in an amount in the range of from about 0.01% to about 10% by weight of the cementitious component. In specific embodiments, the secondary set retarder may be present in an amount ranging between any of and/or including any of about 0.01%, about 0.1%, about 1%, about 2%, about 4%, about 6%, about 8%, or about 10% by weight of the cementitious component. One of ordinary skill in the art, with the benefit of this disclosure, will recognize the appropriate amount of secondary set retarder to include for a chosen application.

The extended-life cement compositions may optionally comprise a dispersant. Examples of suitable dispersants may include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Other suitable dispersants may be polycarboxylated ether dispersants such as Liquiment® 5581F and Liquiment® 514 L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc, Houston, Tex. The Liquiment® 514 L dispersant may comprise 36% by weight of the polycarboxylated ether in water. While a variety of dispersants may be used, some dispersants may be preferred for use with certain cement set retarders. For example, if slurry A comprises a phosphonic acid derivative cement set retarder, a polycarboxylated ether dispersants may be preferable to other dispersants. Without being limited by theory, it is believed that polycarboxylated ether dispersants may synergistically interact with phosphonic acid derivative cement set retarders resulting in formation of a gel that suspends the cementitious component in the composition for an extended period of time. One of ordinary skill in the art, with the benefit of this disclosure, should recognize the appropriate type of dispersant to include for a chosen application.

The dispersant may be included in the extended-life cement compositions in an amount in the range of from about 0.01% to about 5% by weight of the cementitious component. More particularly, the dispersant may be present in an amount ranging between any of and/or including any of about 0.01%, about 0.1%, about 0.5%, about 1%, about 2%, about 3%, about 4%, or about 5% by weight of the cementitious component. One of ordinary skill in the art, with the benefit of this disclosure, will recognize the appropriate amount of dispersant to include for a chosen application.

The extended-life cement compositions may comprise water. The water may be from any source provided that it does not contain an excess of compounds that may undesirably affect other components in the extended-life cement compositions. The water may comprise fresh water or salt water. Salt water generally may include one or more dissolved salts therein and may be saturated or unsaturated as desired for a particular application. Seawater or brines may be suitable for use in some applications. Further, the water may be present in an amount sufficient to form a pumpable slurry. In certain embodiments, the water may be present in the extended-life cement compositions in an amount in the range of from about 33% to about 200% by weight of the cementitious component. In certain embodiments, the water may be present in the extended-life cement compositions in an amount in the range of from about 35% to about 70% by weight of the cementitious component. With the benefit of this disclosure one of ordinary skill in the art should recognize the appropriate amount of water for a chosen application.

Other additives suitable for use in subterranean cementing operations also may be added to the extended-life cement compositions as deemed appropriate by one of ordinary skill in the art. As desired, these additives may be added prior to, or after, storage of the extended-life cement compositions. Examples of such additives include, but are not limited to, strength-retrogression additives, set weighting agents, lightweight additives, gas-generating additives, mechanical property enhancing additives, lost-circulation materials, defoaming agents, foaming agents, thixotropic additives, and combinations thereof. Specific examples of these, and other, additives include silica (e.g., crystalline silica, amorphous silica, fumed silica, etc.), salts, fibers, hydratable clays, shale (e.g., calcined shale, vitrified shale, etc.), microspheres, diatomaceous earth, natural pozzolan, resins, latex, combinations thereof, and the like. Other optional additives may also be included, including, but not limited to, cement kiln dust, lime kiln dust, fly ash, slag cement, shale, zeolite, metakaolin, pumice, perlite, lime, silica, rice husk ash, small-particle size cement, combinations thereof, and the like. A person having ordinary skill in the art, with the benefit of this disclosure, will be able to determine the type and amount of additive useful for a particular application and desired result.

Strength-retrogression additives may be included in extended-life cement compositions to, for example, prevent the retrogression of strength after the extended-life cement composition has been allowed to develop compressive strength. These additives may allow the cement compositions to form as intended, preventing cracks and premature failure of the cementitious composition. Examples of suitable strength-retrogression additives may include, but are not limited to, amorphous silica, coarse grain crystalline silica, fine grain crystalline silica, or a combination thereof.

Weighting agents are typically materials that weigh more than water and may be used to increase the density of the extended-life cement slurries. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Lightweight additives may be included in the extended-life cement compositions to, for example, decrease the density of the extended-life cement compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Gas-generating additives may be included in the extended-life cement compositions to release gas at a predetermined time, which may be beneficial to prevent gas migration from the formation through the extended-life cement composition before it hardens. The generated gas may combine with or inhibit the permeation of the combined extended-life cement composition by formation gas. Examples of suitable gas-generating additives include, but are not limited to, metal particles (e.g., aluminum powder) that react with an alkaline solution to generate a gas.

Mechanical-property-enhancing additives may be included in the extended-life cement compositions to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in embodiments of the extended-life cement compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls.

Defoaming additives may be included in the extended-life cement compositions to, for example, reduce tendency for the extended-life cement slurries to foam during mixing and pumping of the extended-life cement slurries. Examples of suitable defoaming additives include, but are not limited to, polyol silicone compounds. Suitable defoaming additives are available from Halliburton Energy Services, Inc., under the product name D-AIR™ defoamers.

Foaming additives (e.g., foaming surfactants) may be included to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Houston, Tex.

Thixotropic additives may be included in the extended-life cement compositions to, for example, provide an extended-life cement compositions that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

Those of ordinary skill in the art will appreciate that embodiments of the extended-life cement compositions generally should have a density suitable for a particular application. By way of example, the extended-life cement compositions may have a density in the range of from about 4 pounds per gallon ("lb/gal") to about 20 lb/gal. In certain embodiments, the extended-life cement compositions may have a density in the range of from about 8 lb/gal to about 17 lb/gal. Embodiments of the extended-life cement compositions may be foamed or unfoamed or may comprise other means to reduce their densities, such as hollow microspheres, low-density elastic beads, or other density-reducing additives known in the art. In embodiments, the density may be reduced after storage, but prior to placement in a subterranean formation. In embodiments, weighting additives may be used to increase the density of the extended-life cement compositions. Examples of suitable weighting additives may include barite, hematite, hausmannite, calcium carbonate, siderite, ilmenite, or combinations thereof. In particular embodiments, the weighting additives may have a specific gravity of 3 or greater. Those of ordinary skill in the art, with the benefit of this disclosure, should recognize the appropriate density for a particular application.

As previously mentioned, the extended-life cement compositions may have a delayed set in that they may be capable of remaining in a pumpable fluid state for at least one day (e.g., about 1 day, about 2 weeks, about 2 years or more) at room temperature (e.g., about 80° F.) in storage. For example, the extended-life cement compositions may remain in a pumpable fluid state for a period of time from about 1 day to about 7 days or more. In some embodiments, the extended-life cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

As discussed above, when desired for use, the extended-life cement compositions may be activated (e.g., by addition of a cement set activator) to set into a hardened mass. The term "activate", as used herein, refers to the activation of an extended-life cement composition and in certain cases may also refer to the acceleration of the setting of an extended-life cement composition if the mechanism of said activation also accelerates the development of compressive strength. By way of example, a cement set activator may be added to an extended-life cement composition to activate the extended-life cement composition. Alternatively, an extended-life cement composition may be thermally activated, for example, by exposure to elevated temperatures in a well bore. An extended-life cement composition that has been activated may set to form a hardened mass in a time period in the range of from about 1 hour to about 12 days. For example, embodiments of the extended-life cement compositions may set to form a hardened mass in a time period ranging between any of and/or including any of about 1 hour, about 6 hours, about 12 hours, about 1 day, about 2 days, about 4 days, about 6 days, about 8 days, about 10 days, or about 12 days.

The extended-life cement compositions may set to have a desirable compressive strength after activation. Compressive strength is generally the capacity of a material or structure to withstand axially directed pushing forces. The compressive strength may be measured at a specified time after the activation of the extended-life cement compositions while the extended-life cement composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, July 2005.

By way of example, extended-life cement compositions that have been activated may develop a 24-hour compressive strength in the range of from about 50 psi to about 5000 psi, alternatively, from about 100 psi to about 4500 psi, or alternatively from about 500 psi to about 4000 psi. In particular, the extended-life cement compositions may develop a compressive strength in 24 hours of at least about 50 psi, at least about 100 psi, at least about 500 psi, or more. The compressive strength values may be determined using destructive or non-destructive methods at any temperature, however compressive strength development at temperatures ranging from 70° F. to 140° F. may be of particular importance for potential use in subterranean formations having relatively low bottom hole static temperatures.

Examples of suitable cement set activators include, but are not limited to: amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. The cement set activator should be added to embodiments of the extended-life cement compositions in amounts sufficient to induce the extended-life cement compositions to set into a hardened mass. In certain embodiments, the cement set activator may be added to an extended-life cement composition in an amount in the range of about 1% to about 20% by weight of the cementitious component. In specific embodiments, the cement set activator may be present in an amount ranging between any of and/or including any of about 1%, about 5%, about 10%, about 15%, or about 20% by weight of the cementitious component. One of ordinary skill in the art, with the benefit of this disclosure, will recognize the appropriate amount of cement set activator to include for a chosen application.

In some examples, the extended-life cement compositions (after activation) may have desirable thickening times. Thickening time typically refers to the time a fluid, such as an extended-life cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. The extended-life cement compositions (after activation) may have thickening times greater than about 1 hour, alternatively, greater than about 2 hours, greater than about 15 hours, greater than about 30 hours, greater than about 100 hours, or alternatively greater than about 190 hours at 3,000 psi and temperatures in a range of from about 50° F. to about 400° F., alternatively, in a range of from about 70° F. to about 140° F., and alternatively at a temperature of about 100° F.

As will be appreciated by those of ordinary skill in the art, the extended-life cement compositions may be used in a variety of subterranean operations, including primary and remedial cementing. For example, an extended-life cement composition may be provided that comprises a cementitious comprising red mud solids and hydraulic cement; water; a cement set retarder; and optionally a dispersant. A cement set activator may be added to the extended-life cement composition to activate the extended-life cement composition prior to being pumped downhole where it may be introduced into a subterranean formation and allowed to set therein. As used herein, introducing the extended-life cement composition into a subterranean formation includes introduction into any portion of the subterranean formation, including, without limitation, into a wellbore drilled into the subterranean formation, into a near wellbore region surrounding the wellbore, or into both.

Additional applications may include storing extended-life cement compositions. For example, an extended-life cement composition may be provided that comprises a cementitious comprising red mud solids and hydraulic cement; water; a cement set retarder; and optionally a dispersant. The extended-life cement composition may be stored in a vessel or other suitable container. The extended-life cement compositions may be stored and then activated prior to or while pumping downhole. The extended-life cement compositions may be permitted to remain in storage for a desired time period. For example, the extended-life cement compositions may remain in storage for a time period of about 1 day, about 2 weeks, about 2 years, or longer. For example, the extended-life cement compositions may remain in storage for a time period of about 1 day, about 2 days, about 5 days, about 7 days, about 10 days, about 20 days, about 30 days, about 40 days, about 50 days, about 60 days, or up to about 2 years. When desired for use, the extended-life cement compositions may be activated by addition of a cement set activator, introduced into a subterranean formation, and allowed to set therein.

In primary cementing applications, for example, the extended-life cement compositions may be introduced into an annular space between a conduit located in a wellbore and the walls of a wellbore (and/or a larger conduit in the wellbore), wherein the wellbore penetrates the subterranean formation. The extended-life cement compositions may be allowed to set in the annular space to form an annular sheath of hardened cement. The extended-life cement compositions may form a barrier that prevents the migration of fluids in the wellbore. The extended-life cement compositions may also, for example, support the conduit in the wellbore.

In remedial cementing applications, the extended-life cement compositions may be used, for example, in squeeze-cementing operations or in the placement of cement plugs. By way of example, the extended-life compositions may be placed in a wellbore to plug an opening (e.g., a void or crack) in the formation, in a gravel pack, in the conduit, in the cement sheath, and/or between the cement sheath and the conduit (e.g., a microannulus).

A method of cementing may be provided. The method may be used in conjunction with one or more of the methods, compositions, and/or systems illustrated on FIGS. 1-3. The method of cementing may comprise providing an extended-life cement composition comprising a cementitious component, water, and a cement set retarder, wherein the cementitious component comprises red mud solids and a hydraulic cement; activating the extended-life cement composition; introducing the extended-life cement composition into a subterranean formation; and allowing the extended-life cement composition to set in the subterranean formation. The red mud solids may be an insoluble residue from extraction of alumina from bauxite ore. The red mud solids may be present in an amount of about 50% to about 90% by weight of the cementitious component, and wherein the hydraulic cement is present in an amount of about 10% to about 50% by weight of the cementitious component. The red mud solids may be provided in a red mud having a water content up to 25% by weight of the red mud. The hydraulic cement may comprise a Portland cement. The cement set retarder may be selected from the group consisting of a phosphonic acid, a phosphonic acid derivative, a lignosulfonate, a salt, an organic acid, a cellulose derivative, a synthetic co- or ter-polymer comprising sulfonate and carboxylic acid groups, a borate compound, and any combination thereof. The extended-life cement composition may further comprises a dispersant. The cement set retarder may comprise a phosphonic acid derivative, and wherein the extended-life cement composition may further comprise a polycarboxylated ether dispersant. The method may further comprise storing the extended-life cement composition for a period of about 1 day or longer before the step of introducing the cement composition into the subterranean formation. The step of activating the extended-life cement composition may comprise adding a cement set activator to the extended-life cement composition. The step of introducing the extended-life cement composition comprises pumping the extended-life cement composition through a feed pipe and into a wellbore annulus.

A cement composition may be provided. The cement composition may be used in conjunction with one or more of the methods, compositions, and/or systems illustrated on FIGS. 1-3. The cement composition may comprise water; and a cement set retarder, wherein the cement composition is an extended-life cement composition that is capable of remaining in a pumpable fluid state for about 1 day or longer at 80° F. The red mud solids may be an insoluble residue from extraction of alumina from bauxite ore. The red mud solids may be present in an amount of about 50% to about 90% by weight of the cementitious component. The red mud solids may be provided in a red mud having a water content up to 25% by weight of the red mud. The hydraulic cement may be present in an amount of about 10% to about 50% by weight of the cementitious component. The hydraulic cement may comprise a Portland cement. The cement set retarder may be selected from the group consisting of a phosphonic acid, a phosphonic acid derivative, a lignosulfonate, a salt, an organic acid, a cellulose derivative, a synthetic co- or ter-polymer comprising sulfonate and carboxylic acid groups, a borate compound, and any combination thereof. The extended-life cement composition may further comprises a dispersant. The cement set retarder may comprise a phosphonic acid derivative, and wherein the extended-life cement composition may further comprise a polycarboxylated ether dispersant.

A system for cementing may be provided. The system may be used in conjunction with one or more of the methods, compositions, and/or systems illustrated on FIGS. 1-3. The system may comprise an extended-life cement composition that is capable of remaining in a pumpable fluid state for about 1 day or longer at 80° F., wherein the extended-life cement composition comprises a cementitious component, water, and a cement set retarder, wherein the cementitious component comprises red mud solids and a hydraulic cement. The system may further comprise a cement set activator for activating the extended-life cement composition. The system may further comprise a vessel containing the extended-life cement composition and a pump coupled to the vessel for delivering the extended-life cement composition into a well bore. The red mud solids may be an insoluble residue from extraction of alumina from bauxite ore. The red mud solids may be present in an amount of about 50% to about 90% by weight of the cementitious component. The red mud solids may be provided in a red mud having a water content up to 25% by weight of the red mud. The hydraulic cement may be present in an amount of about 10% to about 50% by weight of the cementitious component. The hydraulic cement may comprise a Portland cement. The cement set retarder may be selected from the group consisting of a phosphonic acid, a phosphonic acid derivative, a lignosulfonate, a salt, an organic acid, a cellulose derivative, a synthetic co- or ter-polymer comprising sulfonate and carboxylic acid groups, a borate compound, and any combination thereof. The extended-life cement composition may further comprises a dispersant. The cement set retarder may comprise a phosphonic acid derivative, and wherein the extended-life cement composition may further comprise a polycarboxylated ether dispersant.

Referring now to FIG. 1, preparation of an extended-life cement composition will now be described. FIG. 1 illustrates a system 2 for the preparation of an extended-life cement composition and subsequent delivery of the composition to a wellbore. As shown, the extended-life cement composition may be stored in a vessel 4 and then pumped via pumping equipment 6 to the wellbore. The vessel 4 and the pumping equipment 6 may be disposed on one or more cement trucks as will be apparent to those of ordinary skill in the art. A cement set activator may be added to the extended-life cement composition in the vessel 4 or may be added to extended-life cement composition as it is being pumped from the vessel 4. Alternatively, a cement set activator may be added to an extended-life cement composition after the extended-life cement composition has been pumped into the wellbore. In embodiments that add the cement set activator to the extended-life cement composition as it is being pumped, a jet mixer may be used, for example, to continuously mix the cement set activator and the calcium aluminate cement as it is being pumped to the wellbore. Alternatively, a re-circulating mixer and/or a batch mixer may be used to mix the extended-life cement composition and the cement set activator, and the activator may be added to the mixer as a powder prior to pumping the cement composition downhole. Additionally, batch mixer type units may be plumbed in line with a separate vessel containing a cement set activator. The cement set activator may then be fed in-line with the extended-life cement composition as it is pumped out of the vessel 4. There is no preferred method for preparing or mixing the extended-life cement compositions, and one having ordinary skill in the art should be readily able to prepare, mix, and pump the extended-life cement compositions using the equipment on hand.

Figure 2:
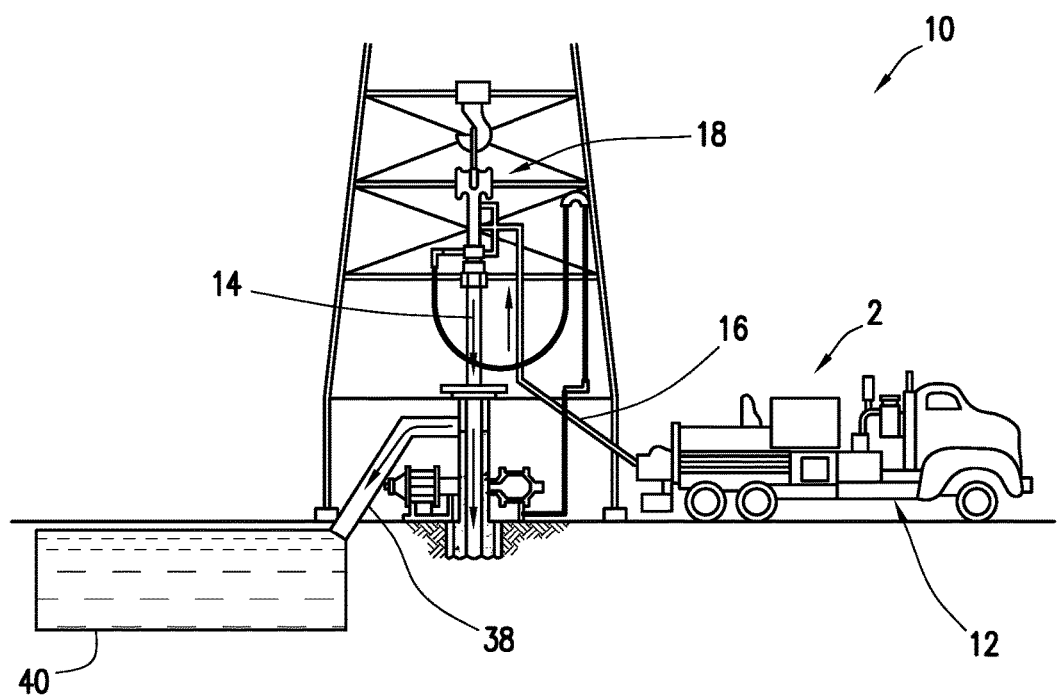
FIG. 2 illustrates surface equipment that may be used in placement of an extended-life cement composition in a wellbore in accordance with certain embodiments.

An example technique for placing an extended-life cement composition into a subterranean formation will now be described with reference to FIGS. 2 and 2B. FIG. 2 illustrates surface equipment 10 that may be used in placement of an extended-life cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include the vessel 4 and the pumping equipment 6 shown in FIG. 1 which is represented by system 2 on the cementing unit 12, as will be apparent to those of ordinary skill in the art. The cementing unit 12 may pump an extended-life cement composition 14 through a feed pipe 16 and to a cementing head 18 which conveys the extended-life cement composition 14 downhole.

Figure 3:
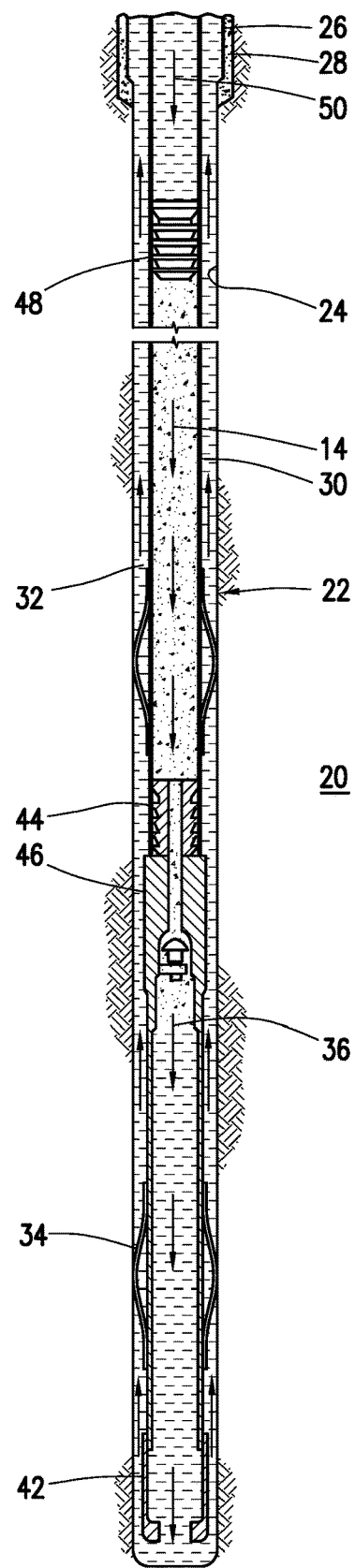
FIG. 3 illustrates placement of an extended-life cement composition into a wellbore annulus in accordance with certain embodiments.

Turning now to FIG. 3, placing the extended-life cement composition 14 into a subterranean formation 20 will now be described. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 3, the extended-life cement composition 14 may be pumped down the interior of the casing 30. The extended-life cement composition 14 may be allowed to flow down the interior of the casing 30 through the casing shoe 42 at the bottom of the casing 30 and up around the casing 30 into the wellbore annulus 32. The extended-life cement composition 14 may be allowed to set in the wellbore annulus 32, for example, to form a cement sheath that supports and positions the casing 30 in the wellbore 22. While not illustrated, other techniques may also be utilized for introduction of the extended-life cement composition 14. By way of example, reverse circulation techniques may be used that include introducing the extended-life cement composition 14 into the subterranean formation 20 by way of the wellbore annulus 32 instead of through the casing 30.

As it is introduced, the extended-life cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2. Referring again to FIG. 3, a bottom plug 44 may be introduced into the wellbore 22 ahead of the extended-life cement composition 14, for example, to separate the extended-life cement composition 14 from the fluids 36 that may be inside the casing 30 prior to cementing. After the bottom plug 44 reaches the landing collar 46, a diaphragm or other suitable device should rupture to allow the extended-life cement composition 14 through the bottom plug 44. In FIG. 3, the bottom plug 44 is shown on the landing collar 46. In the illustrated embodiment, a top plug 48 may be introduced into the wellbore 22 behind the extended-life cement composition 14. The top plug 48 may separate the extended-life cement composition 14 from a displacement fluid 50 and also push the extended-life cement composition 14 through the bottom plug 44.

The exemplary extended-life cement compositions disclosed herein may directly or indirectly affect one or more components or pieces of equipment associated with the preparation, delivery, recapture, recycling, reuse, and/or disposal of the disclosed extended-life cement compositions. For example, the disclosed extended-life cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary extended-life cement compositions. The disclosed extended-life cement compositions may also directly or indirectly affect any transport or delivery equipment used to convey the extended-life cement compositions to a well site or downhole such as, for example, any transport vessels, conduits, pipelines, trucks, tubulars, and/or pipes used to compositionally move the extended-life cement compositions from one location to another, any pumps, compressors, or motors (e.g., topside or downhole) used to drive the extended-life cement compositions into motion, any valves or related joints used to regulate the pressure or flow rate of the extended-life cement compositions, and any sensors (i.e., pressure and temperature), gauges, and/or combinations thereof, and the like. The disclosed extended-life cement compositions may also directly or indirectly affect the various downhole equipment and tools that may come into contact with the extended-life cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present claims, the following examples of certain aspects of the disclosure are given. In no way should the following examples be read to limit, or define, the entire scope of the claims.

Example 1

A sample of red mud was obtained from an alumina manufacturer and subjected to oxide analysis by EDXRF (Energy Dispersive X-Ray Fluorescence) which showed the following composition by weight:

TABLE 1

Full Oxide Analysis of Red Mud

|  | Full Oxide (wt %) | Loss Corrected (wt %) |
| --- | --- | --- |
| $Na_2O$ | 1.19 | 1.34 |
| MgO | 0.07 | 0.08 |
| $Al_2O_3$ | 17.3 | 19.47 |
| $SiO_2$ | 29.77 | 33.51 |
| $SO_3$ | 0.98 | 1.1 |
| $K_2O$ | 1.18 | 1.33 |
| CaO | 18.27 | 20.57 |
| $P_2O_5$ | 1.29 | 1.45 |
| $TiO_2$ | 3.09 | 3.48 |
| $Mn_2O_3$ | 0.33 | 0.37 |
| $Fe_2O_3$ | 15.31 | 17.23 |
| ZnO | 0.02 | 0.02 |
| SrO | 0.04 | 0.05 |
| LOI | 11.16 | — |
| Moisture Content | 22.94 |  |

The sample of red mud was subjected to X-ray diffraction analysis with Rietveld Full Pattern refinement, which showed the following crystalline materials present by weight:

TABLE 2

XRD of Red Mud

| Name | Formula | Red Mud (wt %) |
| --- | --- | --- |
| Calcite | $CaCO_3$ | 22 |
| Quartz | $SiO_2$ | 30 |
| Hatrutite | $(C_3S)$ | 2 |
| Larnite | $(C_2S)$ | 2 |
| Brownmillerite | $(C_4AF)$ | Trace |
| Hematite | $Fe_2O_3$ | 10 |
| Magnetite | $Fe_3O_4$ | 1 |
| Hauyne | $Na_3CaAl_3Si_3O_{12}(SO_4)_2$ | 9 |
| Anhydrite | $CaSO_4$ | 1 |
| Gibbsite | $Al(OH)_3$ | 4 |
| K-feldspar | $KAlSi_3O_8$ | 4 |
| Kaolinite | — | 10 |
| Muscovite | — | 5 |

The sample of the red mud was also subjected to particle size analysis using a Malvern Mastersizer® 3000 laser diffraction particle size analyzer, which showed the following particle size for the solids in the red mud:

TABLE 3

Particle Size Analysis

| Particle Size Distribution | Red Mud Solids |
| --- | --- |
| D10 (microns) | 2.48 |
| D50 (microns) | 31.2 |
| D90 (microns) | 333 |

The density of the sample of the red mud was also determined using a Quantachrome® Ultrapyc 1200. The density was determined before and after drying. The sample was dried in a vacuum oven at 180° F. for 24 hours. The density in grams per cubic centimeter is provided in the table below.

TABLE 4

Density Analysis

| Red Mud | Density (g/cc) |
| --- | --- |
| As received | 2.04 |
| Dried | 2.86 |

Example 2

Sample extended-life cement compositions were prepared to evaluate the use of red mud solids in extended-life cement compositions. To prepare the sample extended-life cement compositions comprising red mud solids, the dried red mud from Example 1 was used. Six sample slurries, labeled Slurries 1 to 6 in the table below, were prepared that comprised water, Portland Class H cement, red mud, a cement set retarder (phosphonic acid derivative), and a polycarboxylated ether dispersant. The sample slurries were the same except the concentration of the cement set retarder was varied. The sample slurries were each prepared by dry blending the Class H cement, red mud, and dispersant. The dry blends were then each added to a blender which contained tap water and the phosphonic acid retarder and blended per API specifications. In these examples, the term "% bwoc" refers to the percent of each component by weight of the cementitious component comprising the Class H cement and red mud solids.

TABLE 5

Sample Compositions

| | Sample Slurry | | | | | |
|---|---|---|---|---|---|---|
| Component | 1 % bwoc | 2 % bwoc | 3 % bwoc | 4 % bwoc | 5 % bwoc | 6 % bwoc |
| Water | 27.1 | 27.1 | 27.1 | 27.1 | 27.1 | 27.1 |
| Class H Cement | 30.0 | 30.0 | 30.0 | 30.0 | 30.0 | 30.0 |
| Red Mud Solids | 70.0 | 70.0 | 70.0 | 70.0 | 70.0 | 70.0 |
| Dispersant | 0.3 | 0.3 | 0.3 | 0.3 | 0.3 | 0.3 |
| Retarder | 0.75 | 1.25 | 1.50 | 1.75 | 2.00 | 2.25 |

After preparation, each slurry was placed in a sealed contained and stored at ambient conditions. The sample slurries were stirred daily and qualitatively observed to determine if they were maintaining an acceptable rheology.

Sample Slurries 1 and 2: After 3 days, sample slurries 1 and 2 had consolidated into a fully set cement and could no longer be stirred.

Sample Slurry 3: After 3 days, sample slurry 3 was still mixable by hand, but consolidated to the point where rheologies could not be obtained.

Sample Slurries 4-6: After 4 days, sample slurries 4-6 were readily mixable but had reached the point where additional retarder was needed to keep them flowable. Accordingly, 0.5% bwoc of a lignosulfonate retarder (HR® 5 retarder, Halliburton Energy Services, Inc.) was added to each of the slurries, and they were monitored for 3 additional days. On day 7, slurries 4-6 were all still mixable and flowable.

Example 3

Additional rheological testing was performed on a sample slurry based on sample slurry 4 from Example 2. The sample slurry comprised water, Portland Class H cement, red mud solids, a cement set retarder (phosphonic acid derivative), a secondary cement set retarder (retarder (HR® 5 retarder). The sample slurry was prepared by dry blending the Class H cement, red mud, dispersant, and secondary retarder. The dry blend was then added to a blender which contained tap water and the phosphonic acid retarder and blended per API specifications.

TABLE 6

Sample Composition

| | Sample Slurry 7 | |
|---|---|---|
| Component | % bwoc | Amount (g) |
| Water | 29.4 | 168.3 |
| Class H Cement | 30.0 | 171.5 |
| Red Mud Solids | 70.0 | 400.1 |
| Dispersant | 0.31 | 1.8 |

TABLE 6-continued

Sample Composition

| | Sample Slurry 7 | |
|---|---|---|
| Component | % bwoc | Amount (g) |
| Retarder | 1.75 | 10.0 |
| Secondary Retarder | 0.50 | 2.85 |

Immediately after preparation (designated Day 0) and periodically thereafter, the apparent viscosities and FYSA decay readings of the sample slurry were measured at Day 0 and Day 4 using a 6-speed Model 35 Fann Viscometer with a Fann Yield Stress Adapter (FYSA), in accordance with the procedure set forth in API RP Practice 10B-2, *Recommended Practice for Testing Well Cements*. The data is presented in Table 7 below.

TABLE 7

Rheological Profile

| | FYSA Readings | | | | | | | | Additional Dispersant |
|---|---|---|---|---|---|---|---|---|---|
| | 3 | 6 | 100 | 200 | 300 | 600 | 3D | 6D | (% bwoc) |
| Day 0 | 30.5 | 31.5 | 35 | 41 | 45.5 | 73 | 28.5 | 29 | — |
| Day 4 | 17.5 | 19 | 43 | 59.5 | 75 | 129 | 7 | 5 | 0.28 |

As shown by these measurements, the sample slurry remained stable for at least 4 days with little to no change in the calculated apparent viscosity. No settling of solids or free fluid was observed in the samples over the test period further supporting the high degree of slurry stability.

After 4 days, the sample slurry was activated by addition of a solution of 43% calcium chloride in a sufficient amount to reach a calcium chloride content in the slurry of 10% bwoc. After addition of the calcium chloride to activate the sample slurry, the slurry was cured in 1 inch by 2 inch brass cylinders that were placed in water baths that were placed in water baths at 90° F. and 140° F. for 24 hours, respectively. Then, the destructive compress strengths (C.S.) were measured using a mechanical press in accordance with the procedure set forth in API RP Practice 10B-2, *Recommended Practice for Testing Well Cements*. The data is presented in table 8 below. The reported compressive strengths are an average for two cylinders of each sample slurry.

TABLE 8

Compressive Strengths

| Sample Slurry | Activator | Temp. (° F.) | Time (Hr) | CS (psi) |
|---|---|---|---|---|
| 7 | — | 90 | 24 | 34 |
| 7 | 10% $CaCl_2$ | 90 | 24 | 494 |
| 7 | — | 140 | 24 | 736 |
| 7 | 10% $CaCl_2$ | 140 | 24 | 987 |

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method of cementing comprising:
providing an extended-life cement composition comprising a cementitious component, water, and a cement set retarder, wherein the cementitious component comprises red mud solids and a hydraulic cement, wherein the red mud solids are present in an amount of about 50% to about 90% by weight of the cementitious component, and wherein the hydraulic cement is present in an amount of about 10% to about 50% by weight of the cementitious component;
activating the extended-life cement composition;
introducing the extended-life cement composition into a subterranean formation; and
allowing the extended-life cement composition to set in the subterranean formation.

2. A method according to claim 1, wherein the red mud solids are an insoluble residue from extraction of alumina from bauxite ore.

3. A method according to claim 1, wherein the red mud solids are provided in a red mud having a water content up to 25% by weight of the red mud.

4. A method according to claim 1, wherein the hydraulic cement comprises a Portland cement.

5. A method according to claim 1, wherein the cement set retarder is selected from the group consisting of a phosphonic acid, a phosphonic acid derivative, a lignosulfonate, a salt, an organic acid, a cellulose derivative, a synthetic co- or ter-polymer comprising sulfonate and carboxylic acid groups, a borate compound, and any combination thereof.

6. A method according to claim 1, wherein the extended-life cement composition further comprises a dispersant.

7. A method according to claim 1, wherein the cement set retarder comprises a phosphonic acid derivative, and wherein the extended-life cement composition further comprises a polycarboxylated ether dispersant.

8. A method according to claim 1, further comprising storing the extended-life cement composition for a period of about 1 day or longer before the step of introducing the cement composition into the subterranean formation.

9. A method according to claim 1, wherein the step of activating the extended-life cement composition comprise adding a cement set activator to the extended-life cement composition.

10. A method according to claim 1, wherein the step of introducing the extended-life cement composition comprises pumping the extended-life cement composition through a feed pipe and into a wellbore annulus.

11. A cement composition comprising:
a cementitious component comprising red mud solids and a hydraulic cement, wherein the red mud solids are present in an amount of about 50% to about 90% by weight of the cementitious component, and wherein the hydraulic cement is present in an amount of about 10% to about 50% by weight of the cementitious component;
water; and
a cement set retarder,
wherein the cement composition is an extended-life cement composition that is capable of remaining in a pumpable fluid state for about 1 day or longer at 80° F.

12. A cement composition according to claim 11, wherein the red mud solids are an insoluble residue from extraction of alumina from bauxite ore.

13. A cement composition according to claim 11, wherein the red mud solids are present in an amount of about 50% to about 90% by weight of the cementitious component, and wherein the hydraulic cement is present in an amount of about 10% to about 50% by weight of the cementitious component.

14. A cement composition according to claim 11, wherein the hydraulic cement comprises a Portland cement.

15. A cement composition according to claim 11, wherein the cement set retarder comprises a phosphonic acid derivative, and wherein the extended-life cement composition further comprises a polycarboxylated ether dispersant.

16. A system for cementing comprising:
an extended-life cement composition that is capable of remaining in a pumpable fluid state for about 1 day or longer at 80° F., wherein the extended-life cement composition comprises a cementitious component, water, and a cement set retarder, wherein the cementitious component comprises red mud solids and a hydraulic cement, wherein the red mud solids are present in an amount of about 50% to about 90% by weight of the cementitious component, and wherein the hydraulic cement is present in an amount of about 10% to about 50% by weight of the cementitious component; and a cement set activator for activating the extended-life cement composition.

17. A system according to claim 16, further comprising a vessel containing the extended-life cement composition and a pump coupled to the vessel for delivering the extended-life cement composition into a well bore.

18. A system according to claim 16, wherein at least one of the first cement set retarder or the second cement set retarder is selected from the group consisting of a phosphonic acid, a phosphonic acid derivative, a lignosulfonate, a salt, an organic acid, a cellulose derivative, a synthetic co- or ter-polymer comprising sulfonate and carboxylic acid groups, a borate compound, and any combination thereof.

19. A system according to claim 16, wherein the cement set retarder comprises a phosphonic acid derivative, and wherein the extended-life cement composition further comprises a polycarboxylated ether dispersant.

\* \* \* \* \*